United States Patent [19]
Naito

[11] Patent Number: 5,890,179
[45] Date of Patent: *Mar. 30, 1999

[54] FIGURE EDITING APPARATUS AND METHOD FOR DISPLAYING EDITED OBJECTS IN A FORM DIFFERENT FROM OBJECTS NOT YET EDITED

[75] Inventor: Yoshiko Naito, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 592,669

[22] Filed: Jan. 26, 1996

[30] Foreign Application Priority Data

Jan. 31, 1995 [JP] Japan .................................. 7-014180

[51] Int. Cl.$^6$ ..................................................... G06T 1/00
[52] U.S. Cl. ........................... 707/530; 207/535; 345/112; 345/142
[58] Field of Search ...................................... 395/169, 167, 395/797; 707/530, 535, 500; 345/467, 471, 112, 117, 141–142, 150, 433

[56] References Cited

U.S. PATENT DOCUMENTS 4,498,143  2/1985  Strezelecki .............................. 395/797
5,187,480  2/1993  Thomas et al. ........................... 341/22
5,319,386  6/1994  Gunn et al. .............................. 345/173
5,384,700  1/1995  Lim et al. ................................ 395/793
5,524,191  6/1996  Storisteanu et al. ..................... 395/793
5,586,198  12/1996  Lakritz .................................... 382/185

FOREIGN PATENT DOCUMENTS 0196355   10/1986   European Pat. Off. .

OTHER PUBLICATIONS

"Die Siemens–Lösung OI–CPE," Siemens Magazine, COM Apr. 1987, p. 29–31.
"Drag, Drop, Done," Funkschau, 20/1993, p. 99.

Primary Examiner—Joseph H. Feild
Attorney, Agent, or Firm—Fitzpatrick, Cella, Harper & Scinto

[57] ABSTRACT

A figure editing apparatus and method includes the feature of displaying a first table of classifications of editing objects. A desired classification from the first table is selected and displayed. A second table containing editing objects is displayed based on the selected classification, and the editing objects are displayed in such a manner that editing objects that have been edited and editing objects that have not yet been edited are displayed in different forms in a common display area. A desired editing object is selected from the second table and displayed, and an editing process is performed based on the selected editing object.

16 Claims, 6 Drawing Sheets

FIG. 7

| | | | | | | | |
|---|---|---|---|---|---|---|---|
| | | | 溝 | 潰 | 流 | | |
| | | | 港 | 潰 | 洛 | | |
| | | 浩 | 津 | 淀 | | | |
| | | 洪 | 沈 | 沿 | | | |
| | | 源 | 注 | 洛 | | | |
| | | 決 | 池 | 洋 | | | |
| | | 深 | 湛 | 涌 | | | |
| | | 況 | 淡 | 湊 | | | |
| | | 漁 | 濁 | 油 | | | |
| | | 泣 | 滝 | 湊 | | | |
| | | 汲 | 滞 | 漫 | | | |
| | | 汽 | 漕 | 滴 | | | |
| | | 洗 | 沫 | 没 | | | |
| | | 浅 | 浅 | 没 | | | |
| | | 清 | 泡 | | | | |
| | | 澄 | 法 | | | | |
| | | 深 | 沸 | | | | |
| | | 浸 | 浮 | | | | |
| | | 浄 | 浜 | | | | |
| | | 涉 | 漂 | | | | |
| | | 消 | 洗 | | | | |
| | | 沼 | 漠 | | | | |
| | | 渚 | 波 | | | | |
| | | 淳 | 池 | | | | |
| | | 酒 | 洞 | | | | |
| | | 漆 | 涛 | | | | |
| | 泳 | 湿 | 湯 | | | | |
| | 滴 | 治 | 淘 | | | | |
| | 済 | 渡 | | | | | |
| | 沙 | 滴 | 涙 | | | | |
| | 泥 | 涼 | | | | | |

FIGURE EDITING APPARATUS AND METHOD FOR DISPLAYING EDITED OBJECTS IN A FORM DIFFERENT FROM OBJECTS NOT YET EDITED

BACKGROUND OF THE INVENTION

1. Field of the Invention

The invention relates to a figure editing apparatus and method which are suitable for correction or the like of a character font and, more particularly, to the designation of an editing object.

2. Related Background Art

Hitherto, in such a kind of figure editing apparatus, when an object to be edited is designated, the object is designated by a number, for example, a JIS code allocated on the basis of a predetermined rule.

However, in order to group characters or the like as editing objects and to sequentially edit every group in accordance with the order other than the numerical order, the operator has to designate the editing objects one by one by the numbers while looking at a memorandum or on the basis of his memory. There is not a method of knowing which object has been edited or is not yet edited. The operator also has to manage such information regarding the editing or unediting by writing such information on a memorandum or the like. There is, consequently, a problem such that the operator is largely burdened and a mistake also easily occurs.

SUMMARY OF THE INVENTION

The invention is made to solve such problems and it is an object of the invention to provide figure editing apparatus and method which can easily and certainly designate an editing object when editing objects are edited in accordance with the order other than the numerical order as in case of sequentially editing the editing objects every group or the like.

To accomplish the above object, according to the invention there is provided a figure editing apparatus comprising: a first display means for displaying a table of classifications of editing objects; a first selecting unit for selecting a desired classification from the classification table displayed by the first display unit; a second display for displaying a table of editing objects based on the classification selected by the first selecting unit; and a second selecting unit for selecting a desired editing object from the editing object table displayed by the second display.

According to the invention, there is also provided a figure editing method comprising: a first display step of displaying a table of classifications of editing objects; a first selecting step of selecting a desired classification from the classification table displayed in the first display step; a second display step of displaying a table of editing objects based on the classification selected in the first selecting step; and a second selecting step of selecting a desired editing object from the editing object table displayed in the second display step.

BRIEF DESCRIPTION OF THE DRAWINGS

FIG. 7 is a diagram showing an example of a table of characters.

DETAILED DESCRIPTION OF THE PREFERRED EMBODIMENT

The invention will now be described in more detail hereinbelow with respect to an embodiment.

Figures 1, 2:
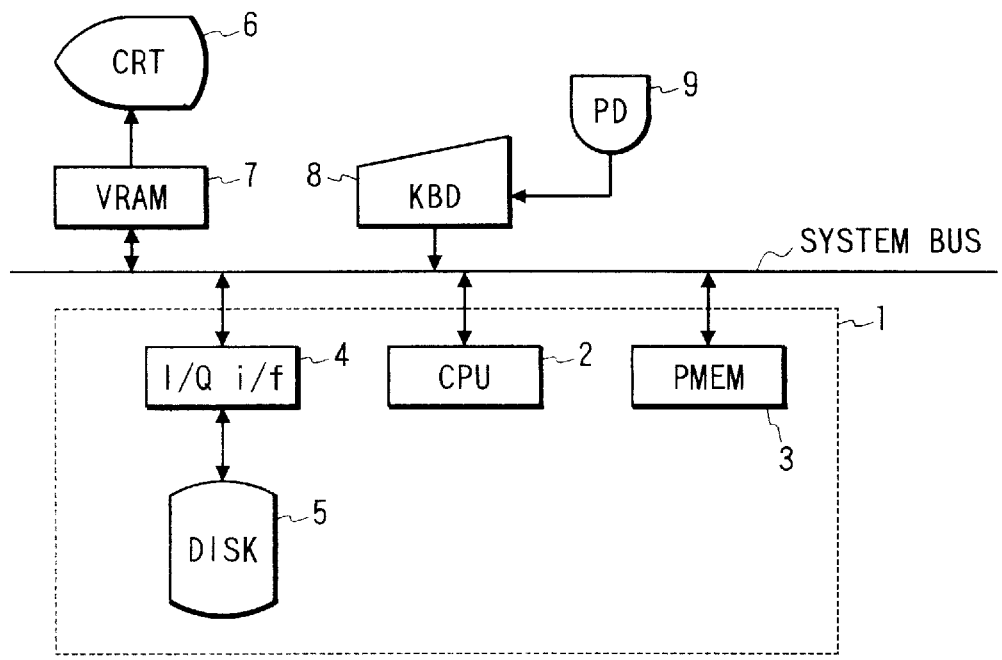
FIG. 1 is a block diagram of a figure editing apparatus according to an embodiment.
FIG. 2 is a diagram showing a group definition table.
Figure 3:
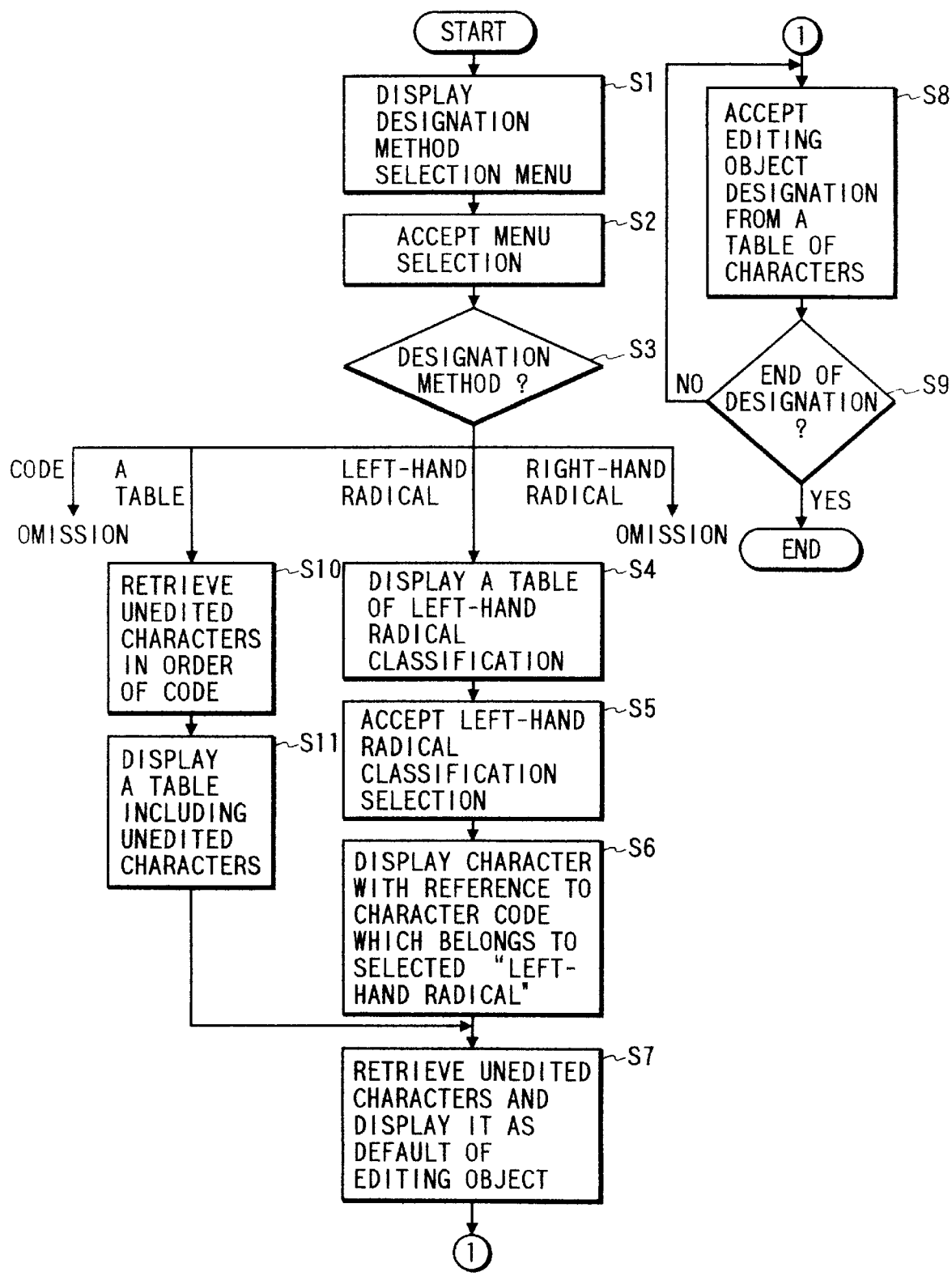
FIG. 3 is a flowchart showing the operation of the embodiment.

FIG. 1 is a block diagram showing a construction of a "figure editing apparatus" according to an embodiment. In the diagram, reference numeral 1 denotes a control section of the figure editing apparatus and is constructed by: a CPU (central processing unit) 2 for executing programs to realize the operation expressed by a flowchart, which will be explained hereinlater; an internal memory, namely, a program memory (PMEM) 3 comprising a random access memory (RAM) or the like; an input/output interface (I/O-I/F) 4 such as a hard disk or the like; and an external memory device 5 such as a hard disk or the like. The programs to realize the operation which is expressed by the flowchart, which will be explained hereinlater, have been stored in the PMEM 3.

Reference numeral 6 denotes a CRT as an image display section in the figure editing apparatus; 7 a VRAM (video memory) in which data to be displayed on the CRT 6 is developed on a bit map; 8 a device such as a keyboard for accepting a key input; and 9 a PD (pointing device) which can select and designate a command image or the like on a command menu by arbitrarily moving a cursor on the CRT 6 in the X and Y directions.

The operation of the embodiment will now be described with respect to an example of correction of a character shape of a Chinese character as an example of figure editing.

An editing order other than the numerical order is previously defined. In the embodiment, as an example of editing after editing objects were grouped, an explanation will now be made with respect to the case where the editing objects are grouped every radical such as "left-hand radical" constructing the left portion of a Chinese character, "right-hand radical" constructing the right portion, or the like. The group of editing objects which were grouped every classification of "left-hand radical" such as "SANZUI", "KIHEN", or the like is defined as shown in FIG. 2 and stored in the external memory device 5. The designation of the editing object will now be described with reference to FIGS. 3 to 7.

Figure 5:
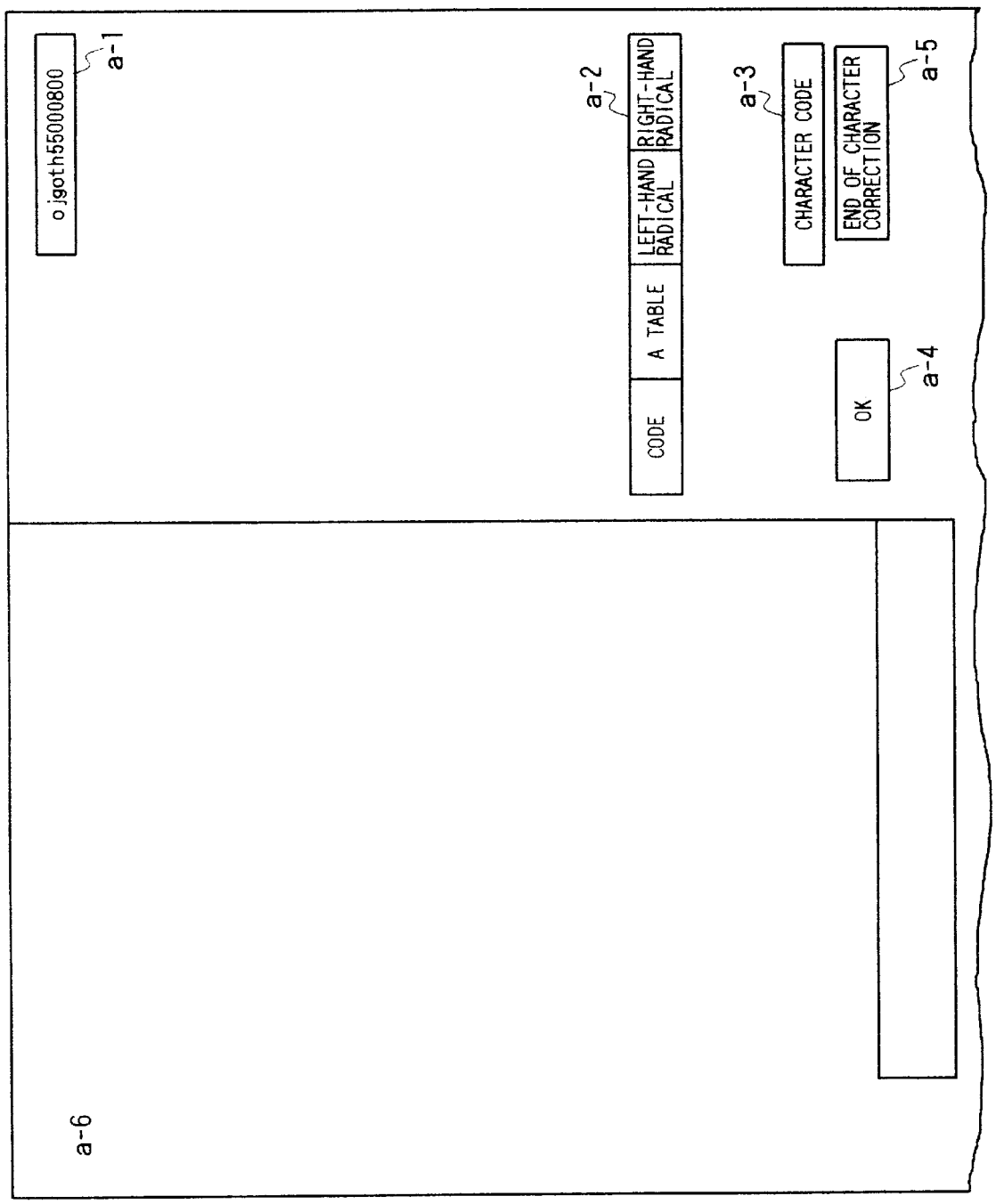
FIG. 5 is a diagram showing a selection menu screen of an editing object designation method.
Figure 6:
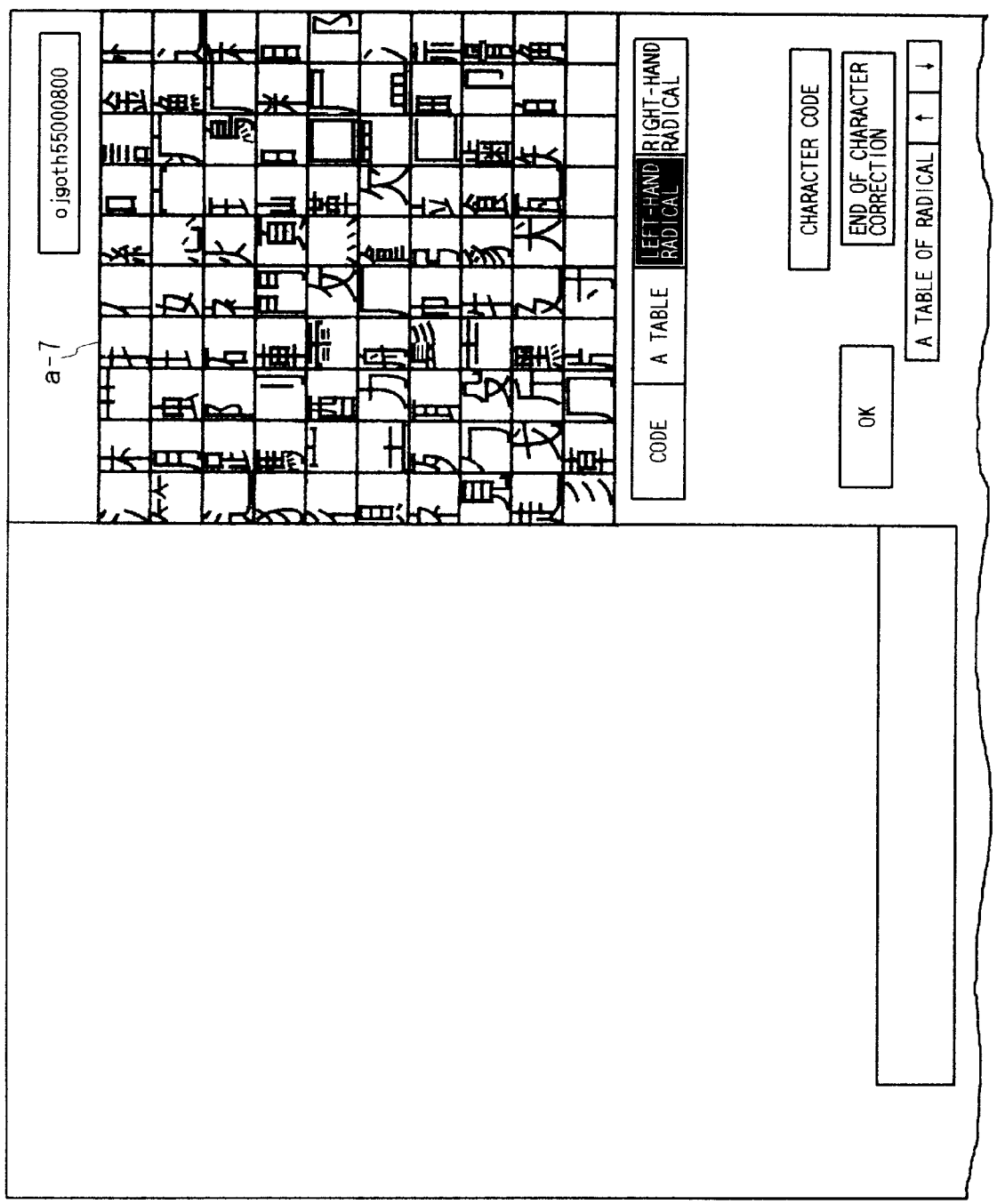
FIG. 6 is a diagram showing a selection menu screen of a left-hand radical (of Chinese character) classification.

When a name of file which has been stored in the external memory device 5 and is to be edited is designated, in step S1 (shown by S1 in FIG. 3; the same shall also apply hereinafter), a picture plane about a selection menu of an editing object designation method shown in FIG. 5 is displayed on the CRT 6 through the VRAM 7 by the CPU 2. In FIG. 5, a-1 denotes a name of a file which was designated and is to be edited; a-2 indicates a selection menu of an editing object designation method; a-3 a region in which a code of the editing object is displayed and the code is inputted by using, for example, the keyboard 8; a-4 an instructing portion to instruct a confirmation of the designation of the editing object; a-5 an instructing portion to instruct the end of character correction; and a-6 a region to display a table of characters which conform with the editing object designation method.

In step S2, the selection of the designation method of any one of "code", "a table", "left-hand radical", and "right-hand radical" in the editing object designation method selection menu a-2 in the PD 9 is accepted. The designation method accepted here is judged in step S3 and processed in step S4 and subsequent steps are executed in accordance with the designation method. In the flowchart, processing flows for "code" and "right-hand radical" are omitted.

In step S2, a case where "left-hand radical" is selected as a designation method will be first described. In step S4, a "left-hand radical" classification menu as shown in a-7 in FIG. 6 to designate the classification of "left-hand radical" is displayed on the CRT 6 through the VRAM 7. In step S5, the designation of any one of the classification of "left-hand radical" in the "left-hand radical" classification menu a-7 by the PD 9 is accepted. In step S6, in order to store information of the editing object which belongs to the designated classification into a data region shown in FIGS. 4A to 4D, a group definition table shown in FIG. 2 stored in the external memory device 5 is referred through the I/O-I/F 4. The number of characters which belong to the designated classification is stored into "ncode" in FIG. 4A and the character code is stored into "code[i]" in FIG. 4B and they are held in the PMEM 3. A check is made to see whether the data of the code set into "code[i]" in FIG. 4B has been stored in the external memory device 5 and exists at present on the file designated for editing or not. It is retrieved to see whether the data has already been edited or not by using ID information which indicates whether the data has been edited or is not yet edited and which has been allocated every data on the designated file. When the data doesn't exist on the designated file, "−1" is set into "status[i]" in FIG. 4C. When the data has already been edited, "1" is set. When the data is not edited yet, "0" is set. After completion of the retrieval of all of the data in "code[i]", a character table as shown in FIG. 7 is displayed as a selection menu into the region a-6 in FIG. 5 while referring to "status[i]". When "status[i]" is equal to −1, nothing is displayed. When "status[i]" is equal to 1, for example, the relevant character is inverted and displayed as shown in the diagram, thereby indicating that the object has already been edited.

Figure 4A:
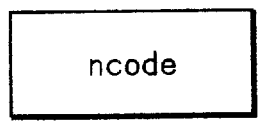
FIGS. 4A to 4D are diagrams showing a data structure in the embodiment.
Figure 4B:
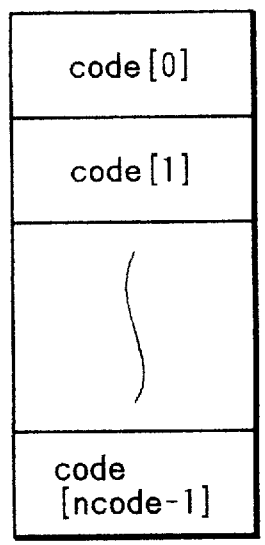
Figure 4C:
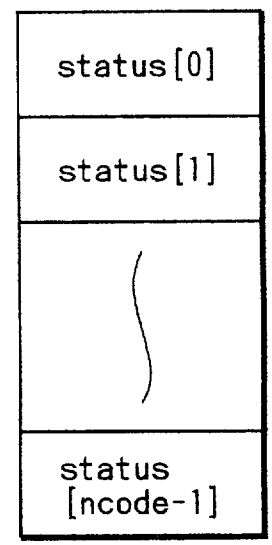
Figure 4D:
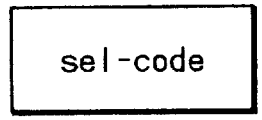

In step S7, "status[i]" is sequentially retrieved from a point i=0. A character in which the data is first equal to 0, namely, a character code that is not edited is set to a default of the editing object, namely, it is temporarily designated as an editing object. Corresponding "code[i]" in FIG. 4B is referred and the value is set to "sel_code" in FIG. 4D and is displayed through the VRAM 7 into the code display region a-3 in FIG. 5 displayed on the CRT 6. In order to show which character the code of a-3 indicates, it is surrounded by a bold frame on a menu as shown in FIG. 7. In step S7, when no unedited data is found, −1 is set into "sel_code". In step S8, the instruction by the PD 9 for the menu of the character table displayed in step S7 is accepted.

Specifically speaking, in the character table (refer to FIG. 7) displayed in the display region a-6 in FIG. 5, if the character surrounded by the bold frame mentioned above is selected as it is, by indicating "OK" in the display region a-4 in FIG. 5 by the PD 9, the designation of the editing object is completed (S9). When another character instead of the character surrounded by the bold frame is designated as an editing object, such a character is designated in the character table by the PD 9. Thus, since the display of the bold frame is moved to the designated character, the display is confirmed and "OK" in the display region a-4 is designated by the PD 9, thereby completing the designation of the editing object (S9).

A character figure of the editing object designated in this way is displayed on an editing screen (not shown) and the editing of the character shape is performed.

After the character shape was edited, by indicating the character correction end instructing portion a-5 by the PD 9, the display of the screen of the editing object designation method selection menu is finished.

In step S2, in the case where "right-hand radical" is selected as a designation method, processes are executed in a manner similar to the case where "left-hand radical" is selected. Its description is omitted.

In step S2, processes in the case where "a table" is selected will be described. In step S10, the external memory device 5 in which the editing objects have been stored is referred through the I/O-I/F 4, the unedited characters are retrieved in accordance with the order of character codes, and the value is set into "sel_code" in accordance with the result of the retrieval. "ncode" denotes the number of characters of one page of the character table and is predetermined. Data as much as one page of the character table including the unedited characters is set into "code[i]" in the PMEM 3. The value according to a status of the data is set into "status[i]". In step S11, the inversion display or the like is executed with reference to "status[i]" in a way similar to step S6. Subsequently, processes in steps S7 and S8 are executed.

Although the designation method of the editing object by the code is omitted, it is designated by a well-known method of designating by the number here.

In the embodiment, although the edited character has been inverted and displayed, in case of using a color display as a CRT 6, the edited character can be also displayed in a color different from that of the unedited character.

As described above, according to the embodiment, the character as an editing object can be easily and certainly designated from a predetermined character group. Whether the characters in the group have been edited or not edited yet can be easily known. (Modification)

The invention is not limited to the foregoing embodiment. The editing object is not limited to the character but the invention can be also applied to an object such as a CAD drawing which can be edited by the figure editing apparatus. The grouping process is not limited to "left-hand radical" or "right-hand radical" but the invention can be also applied to objects which are defined by the format shown in FIG. 2. The device for designating the editing method is not limited to the PD 9 but the invention can be also similarly applied to the keyboard 8.

What is claimed is:

1. A figure editing apparatus comprising:

first display means for displaying a first table, which has classifications of editing objects;

first selecting means for selecting a desired classification from said first table displayed by said first display means;

second display means for displaying, as a second table, a table of editing objects based on the classification selected by said first selecting means, said second display means displaying the editing objects in such a manner that editing objects that have been edited and editing objects that have not yet been edited are displayed in different forms in a common display area;

second selecting means for selecting a desired editing object from the second table displayed by said second display means; and editing means for performing an editing process based on the editing object selected by said second selecting means.

2. An apparatus according to claim 1, wherein in the second table, said second display means reverses a color of and displays the editing object which was edited.

3. An apparatus according to claim 1, wherein in the second table, said second display means displays the editing object which has been edited using a color different from that of the editing object which has not yet been edited.

4. An apparatus according to claim 1, wherein in the second table, said second display means performs a special display of an editing object that has not been edited yet to indicate a temporary designation as a first candidate to be edited.

5. An apparatus according to claim 4, wherein in the second table, said second display means encloses the first candidate with a bold frame and displays said first candidate.

6. An apparatus according to claim 1, wherein said editing object is a Kanji (Chinese character).

7. An apparatus according to claim 6, wherein the classification of said editing object is a radical of the Kanji.

8. An apparatus according to claim 1, further comprising:

third display means for displaying a third table, which has designation methods for designating the editing object; and third selecting means for selecting a desired designation method from the third table displayed by said third display means, wherein said first display means displays the classifications of the editing objects in the first table based on the designation method selected by said third selecting means.

9. A figure editing method comprising:

a first display step of displaying a first table, which has classifications of editing objects, on display means;

a first selecting step of selecting a desired classification from the first table displayed on the display means in said first display step by using designation means;

a second display step of displaying, as a second table, a table of editing objects based on the classification selected in said first selecting step, said second table being displayed on the display means in such a manner that an editing object that has been edited and an editing object that has not yet been edited are displayed in different display forms in a common display area;

a second s electing step of selecting a desired editing object from the second table displayed on said display means in said second display step by using the designation means; and an editing step of performing an editing process based on the editing object selected in said second selecting step.

10. A method according to claim 9, wherein in the second table, the editing object which was edited is reversed in color and displayed in said second display step.

11. A method according to claim 9, wherein in the second table, the editing object which has been edited is displayed in said second display step using a color different from that of the editing object which has not yet been edited.

12. A method according to claim 9, wherein in the second table, a special display of an editing object which has not yet been edited is performed to indicate a temporary designation as a first candidate to be edited.

13. A method according to claim 12, wherein in the second table, the first candidate is enclosed by a bold frame and is displayed in said second display step.

14. A method according to claim 9, wherein said editing object is a Kanji (Chinese character).

15. A method according to claim 14, wherein the classification of said editing object is a radical of said Kanji.

16. A method according to claim 9, further comprising:

a third display step of displaying a third table, which has designation methods of designating the editing objects; and a third selecting step of selecting a desired designation method from said third table displayed in said third display step, wherein the classifications of the editing objects displayed in the first table in said first display step are based on the designation method selected in said third selecting step.

* * * * *

UNITED STATES PATENT AND TRADEMARK OFFICE
CERTIFICATE OF CORRECTION

PATENT NO. : 5,890,179

DATED : March 30, 1999

INVENTOR(S): YOSHIKO NAITO

Page 1 of 2

It is certified that error appears in the above-identified patent and that said Letters Patent is hereby corrected as shown below:

COLUMN 1

Line 41, "means" should be deleted.

Line 44, "display unit;" should read --display;--.

COLUMN 4

Line 57, "the editing objects in such a" should be deleted.

Line 58, "manner that" should be deleted; and "edited" should read --edited in a first display form--.

Line 59, "editing" should read --displaying editing--; and "edited are dis-" should read --edited in a second display form--.

Line 60, "played in different forms" should be deleted.

UNITED STATES PATENT AND TRADEMARK OFFICE
CERTIFICATE OF CORRECTION

PATENT NO. : 5,890,179

DATED : March 30, 1999

INVENTOR(S): YOSHIKO NAITO

It is certified that error appears in the above-identified patent and that said Letters Patent is hereby corrected as shown below:

COLUMN 6

Line 3, "different display forms" should read --a first display form and in a second display form, respectively,--.

Line 4, "s electing" should read --selecting--.

Signed and Sealed this

Seventh Day of December, 1999

Attest:

Q. TODD DICKINSON

Attesting Officer

Acting Commissioner of Patents and Trademarks